(12) United States Patent
Yuki

(10) Patent No.: US 8,856,297 B2
(45) Date of Patent: Oct. 7, 2014

(54) DEVICE CONTROL APPARATUS, DEVICE INFORMATION ACQUIRING METHOD, AND COMPUTER-READABLE RECORDING MEDIUM

(75) Inventor: Tsutomu Yuki, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 182 days.

(21) Appl. No.: 12/389,605

(22) Filed: Feb. 20, 2009

(65) Prior Publication Data

US 2009/0222545 A1 Sep. 3, 2009

(30) Foreign Application Priority Data

Mar. 3, 2008 (JP) .................................. 2008-051725
Dec. 3, 2008 (JP) .................................. 2008-308957

(51) Int. Cl.
 *G06F 15/173* (2006.01)
 *H04L 29/08* (2006.01)
 *H04L 12/28* (2006.01)
 *H04L 12/24* (2006.01)

(52) U.S. Cl.
 CPC .......... *H04L 12/2818* (2013.01); *H04L 67/125* (2013.01); *H04L 41/0809* (2013.01); *H04L 41/08* (2013.01); *H04L 41/0803* (2013.01)
 USPC ........... 709/223; 709/202; 709/203; 709/227; 709/228

(58) Field of Classification Search
 CPC ... H04L 67/125; H04L 41/08; H04L 41/0803; H04L 41/0809
 See application file for complete search history.

(56) References Cited

U.S. PATENT DOCUMENTS

| 5,819,107 | A | * | 10/1998 | Lichtman et al. ................. 710/8 |
| 6,473,783 | B2 | * | 10/2002 | Goshey et al. ................ 709/203 |
| 7,290,044 | B2 | | 10/2007 | Yuki |
| 2002/0186676 | A1 | | 12/2002 | Milley et al. |
| 2003/0191719 | A1 | | 10/2003 | Ginter et al. |
| 2005/0086654 | A1 | | 4/2005 | Sumi et al. |
| 2005/0128957 | A1 | | 6/2005 | Yuki |
| 2006/0029082 | A1 | | 2/2006 | Yuki |
| 2006/0117369 | A1 | | 6/2006 | Lee |
| 2007/0061438 | A1 | | 3/2007 | Yuki |
| 2007/0195781 | A1 | | 8/2007 | Yuki |

FOREIGN PATENT DOCUMENTS

| EP | 1 603 306 A | 12/2005 |
| JP | 2000-293465 | 10/2000 |
| JP | 2003-008610 | 1/2003 |
| WO | WO 00/51096 A | 8/2000 |

OTHER PUBLICATIONS

Extended European Search Report.
European Office Action dated Mar. 17, 2014.
Japanese Office Action dated Feb. 12, 2013.

* cited by examiner

*Primary Examiner* — Thu Nguyen
*Assistant Examiner* — Nam Tran
(74) *Attorney, Agent, or Firm* — IPUSA, PLLC

(57) ABSTRACT

A device control apparatus configured to control a device based on device information acquired from the device, the device control apparatus including a search part configured to search for an information processing apparatus connected to a network; a remote control availability determining part configured to determine whether the information processing apparatus searched by the search part can be controlled by remote control; and a device information acquiring part configured to control the information processing apparatus by the remote control.

12 Claims, 11 Drawing Sheets

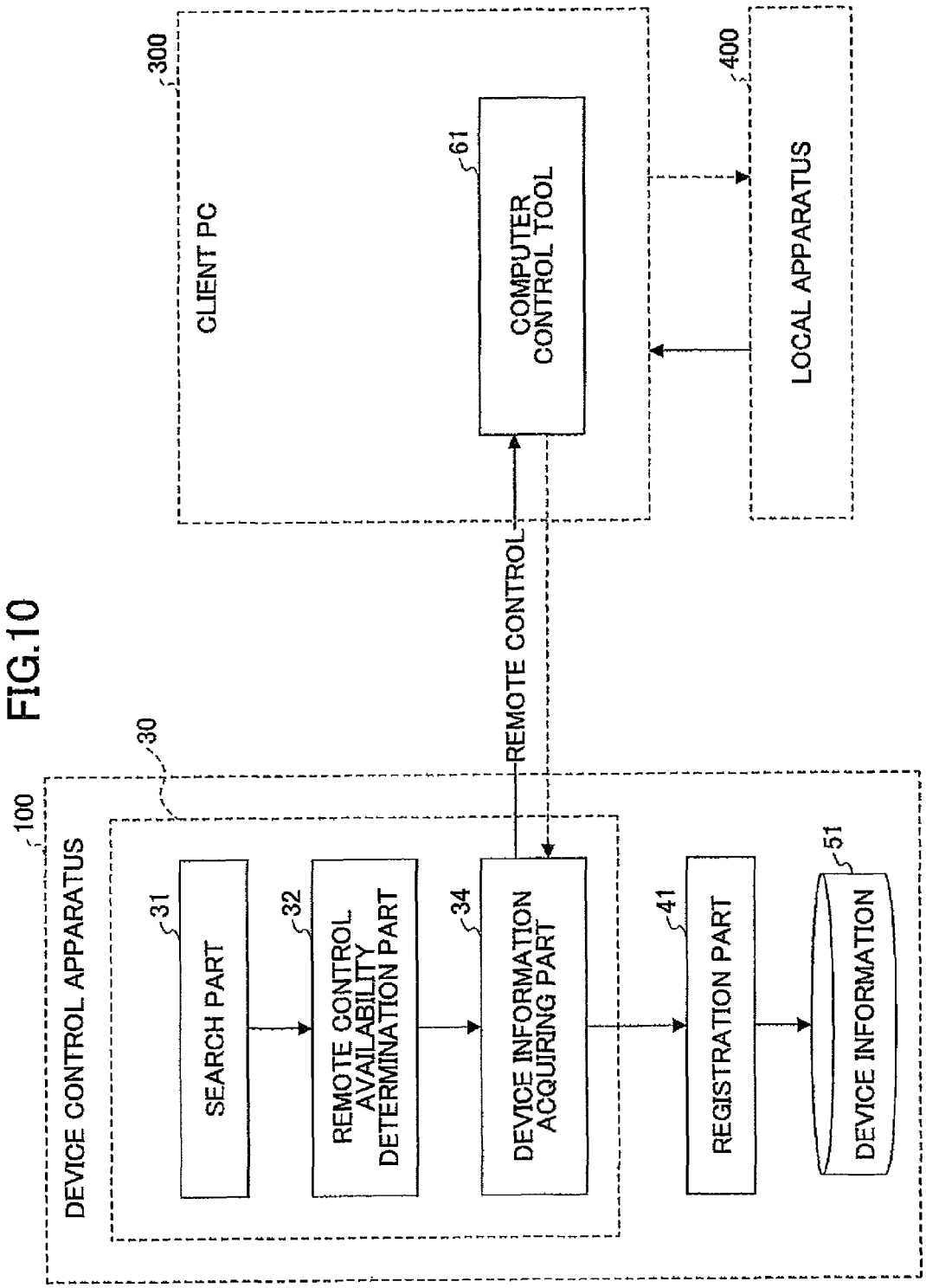

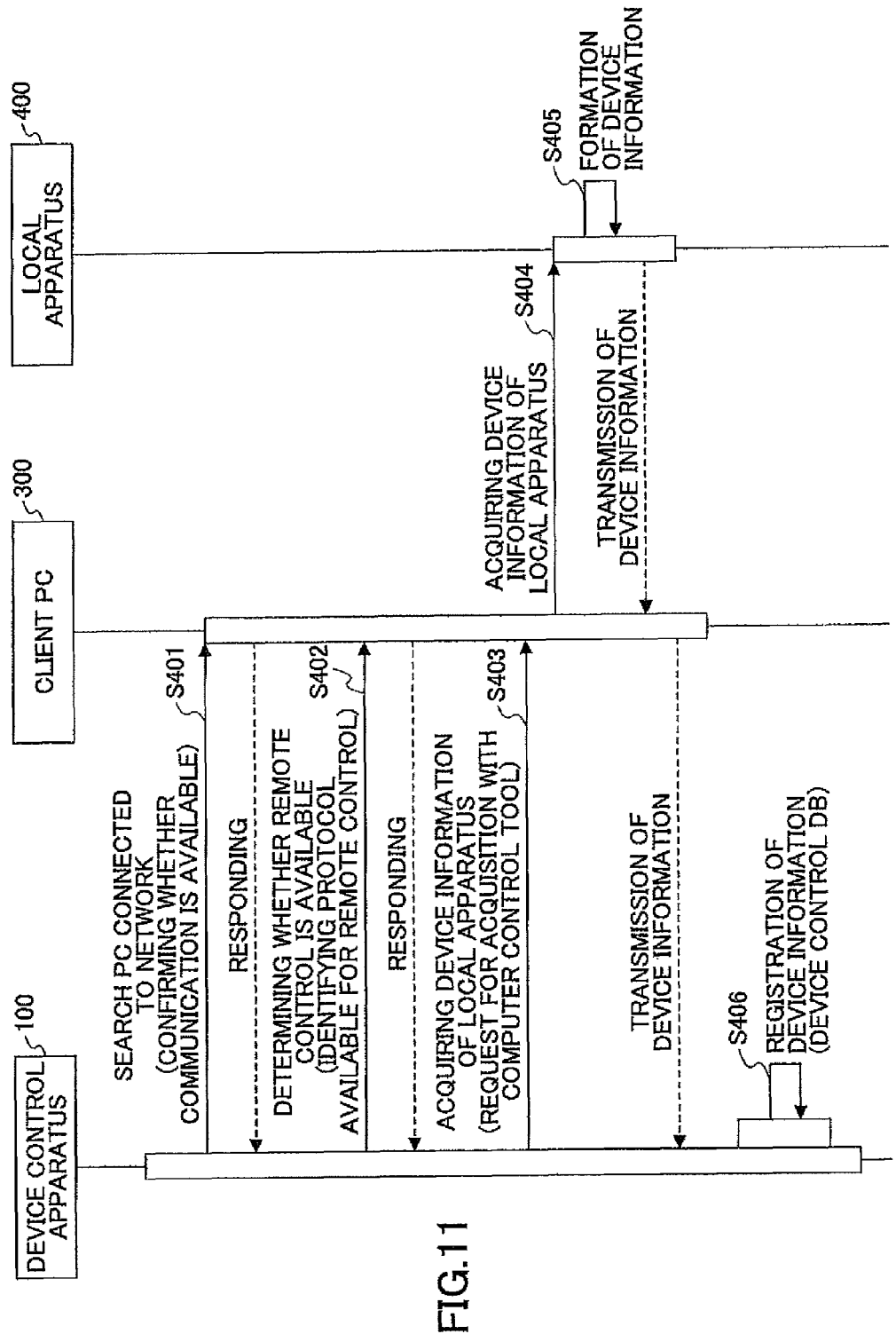

DEVICE CONTROL APPARATUS, DEVICE INFORMATION ACQUIRING METHOD, AND COMPUTER-READABLE RECORDING MEDIUM

BACKGROUND OF THE INVENTION

1. Field of the Invention

The present invention generally relates to a device control apparatus which controls at least one apparatus connected to a data transmission line such as a network, a device information acquiring method, and a computer-readable recording medium having instructions executable by a computer to execute the device control method. More specifically, the present invention relates to a device control apparatus which also acquires device information from an apparatus not directly connected to the network, and further controls the apparatus not directly connected to the network as well as apparatuses that are connected to the network.

2. Description of the Related Art

A related art device control system controls a device/apparatus (referred to an apparatus in the following) connected to a network as described in Japanese Patent Application Publication No. 2007-221565.

However, there is a problem in that the related art device control system cannot control an apparatus that is not directly connected (referred to as a local apparatus in the following) to the network.

The apparatus called "local apparatus" here is, for example, a printer or a scanner to be connected to an information processing apparatus such as a personal computer (PC) via a Universal Serial Bus (USB) cable or a data transmission line (local connection).

The problem described above can be reduced by using the PC connected to the local apparatus as a network-device control apparatus for controlling apparatuses connected to the network as described in Japanese Patent Application Publication No. 2000-293465.

For example, by providing a PC connected to a local apparatus with a function of a print server PC (e.g., a NetWare (registered trademark) server of Novell Inc.), information (referred to as 'apparatus information') with respect to the apparatus including status information can be acquired from a printer by the function of the print server (via the print server software).

However, there is a problem in that the related arts described above cannot acquire the apparatus information from the apparatus not directly connected to the network without installing specific software such as print server software.

In other words, even if the local apparatus is connected to the PC via the device control apparatus via the network, the device control apparatus cannot acquire the apparatus information from the local apparatus if the PC does not perform the function of the print server (referred to as print server function).

SUMMARY OF THE INVENTION

It is a general object of the present invention to provide a novel and useful device control apparatus, device information acquiring method and computer-readable recording medium, in which the problem above is minimized.

On aspect of the preset invention is to provide a device control apparatus configured to control a device based on device information acquired from the device, the device control apparatus including a search part configured to search for an information processing apparatus connected to a network, the network where the device control apparatus is connected, the device being locally connected to the information processing apparatus via a predetermined interface; a remote control availability determining part configured to determine whether the information processing apparatus searched by the search part can be controlled by remote control; and a device information acquiring part configured to control the information processing apparatus by the remote control based on a determination result of the remote control availability determining part, and acquire device information of the device locally connected to the information processing apparatus.

According to one aspect to the present invention, there is provided a device control method for controlling a device based on device information acquired from the device, the device control method including the steps of: (a) searching an information processing apparatus connected to a network, the network where a device control apparatus is connected, the device being locally connected to the information processing apparatus via a predetermined interface; (b) determining whether the information processing apparatus searched in the step of (a) can be controlled by remote control; (c) controlling the information processing apparatus by the remote control based on a determination result in the step of (b), and acquiring device information of the device locally connected to the information processing apparatus.

Another aspect of the present invention is to provide a computer-readable recording medium storing a program causing a computer to perform a device control method, the method including the steps of: (a) searching an information processing apparatus connected to a network, the network where a device control apparatus is connected, the device being locally connected to the information processing apparatus via a predetermined interface; (b) determining whether the information processing apparatus searched in the step of (a) can be controlled by remote control; (c) controlling the information processing apparatus by the remote control based on a determination result in the step of (b), and acquiring device information of the device locally connected to the information processing apparatus.

Other objects, features and advantages of the present invention will become more apparent from the following detailed description when read in conjunction with the accompanying drawings.

BRIEF DESCRIPTION OF THE DRAWINGS

FIG. 10 is a drawing showing a structural example of functions of device information acquisition according to the fourth embodiment of the present invention; and FIG. 11 a sequence diagram indicating a process sequence for acquiring the device information of the local apparatus according to the fourth embodiment of the present invention.

DETAILED DESCRIPTION OF THE PREFERRED EMBODIMENTS

In the following, preferred embodiments of the present invention will described with accompanying drawings.

[First Embodiment]
<System Configuration>

Figure 1:
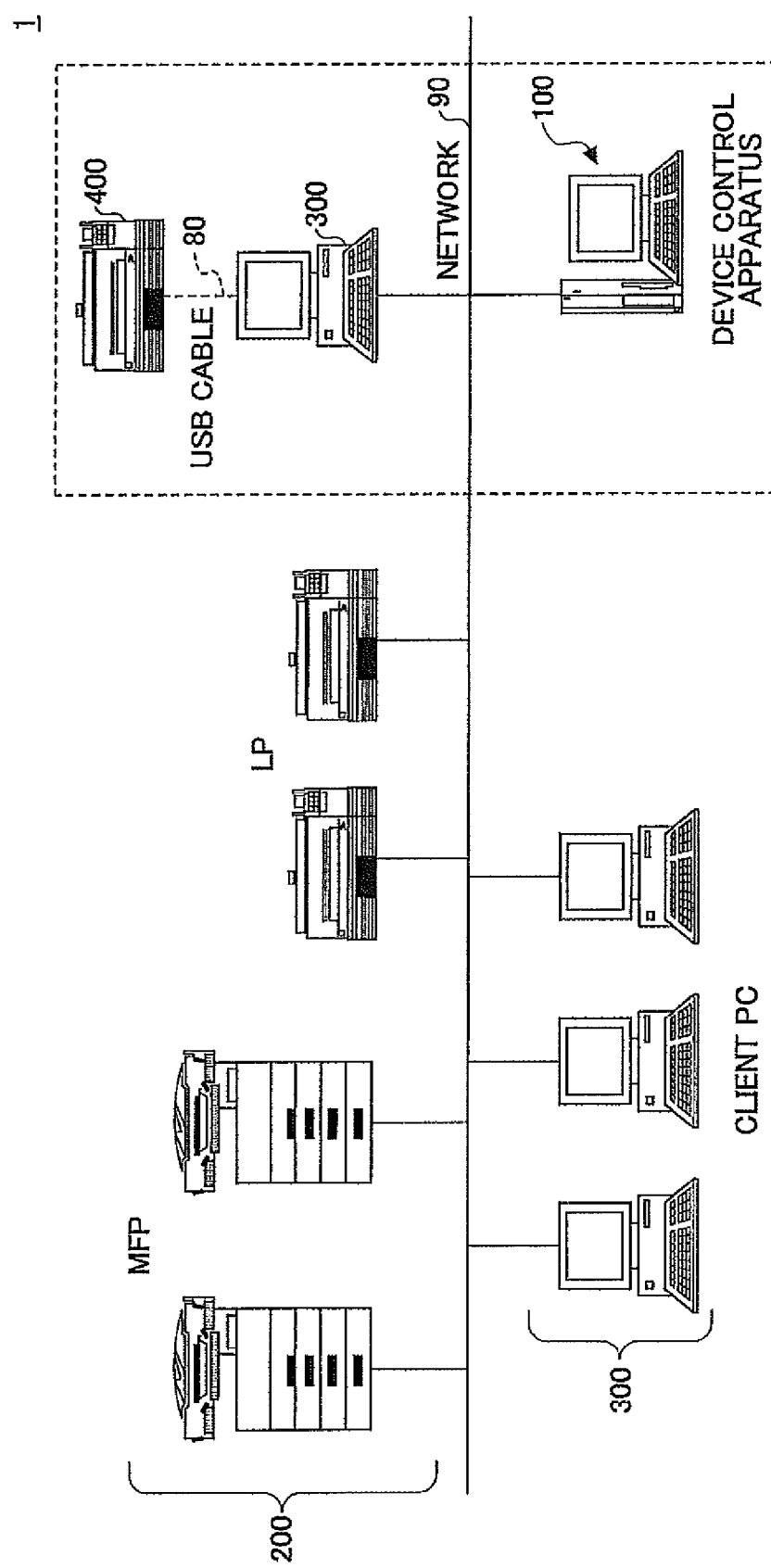
FIG. 1 shows a structural example of a device control system according to the first embodiment of the present invention.

A description will be given for a configuration of a device control system of this embodiment. FIG. 1 is a drawing showing an example of a configuration of a device control system 1 according to the first embodiment of the present invention.

As shown in FIG. 1, the device control system 1 includes plural apparatuses 200 (referred to as "network apparatus 200") such as a multifunction peripheral (MFP), a laser printer (LP), plural client personal computers 300 (referred to as "PC 300"), and a device control apparatus 100, which are connected to one another via a network 90.

With the configuration, the device control apparatus 100 collects device information from the network apparatus 200 by a device control function running in the device control apparatus 100 and monitors the state of the apparatuses, thereby allowing the device control apparatus 100 to control the apparatuses. Also, each type of information with respect to the network apparatus 200 is provided to the PC 300.

Further, some of the PCs 300 include a local apparatus 400 connected via a local connection such as a USB cable 80. In this case, the method of the connection between the PC 300 and the local apparatus 400 is not limited by use of the USB cable 80. For example, a high speed serial bus (or FireWire) of the Institute of Electrical and Electronic Engineers 1394 (IEEE 1394) may be used. The connection method may be any method as long as the method allows bi-direction communication between the apparatuses. In the following, descriptions will be given based on a case where the USB cable 80 is used, for convenience.

Normally, the local apparatus 400 cannot be controlled by the device control apparatus 100 because the local apparatus 400 is not directly connected to the network 90. That is, unlike the network apparatus 200, the local apparatus 400 cannot be managed as a control target apparatus.

In the related art, specific software (print server) is installed into the PC 300, and then the PC 300 responds to the device control apparatus 100 instead of the local apparatus 400, so that the local apparatus 400 can be managed as the control target apparatus.

<Hardware Configuration>

Figure 2:
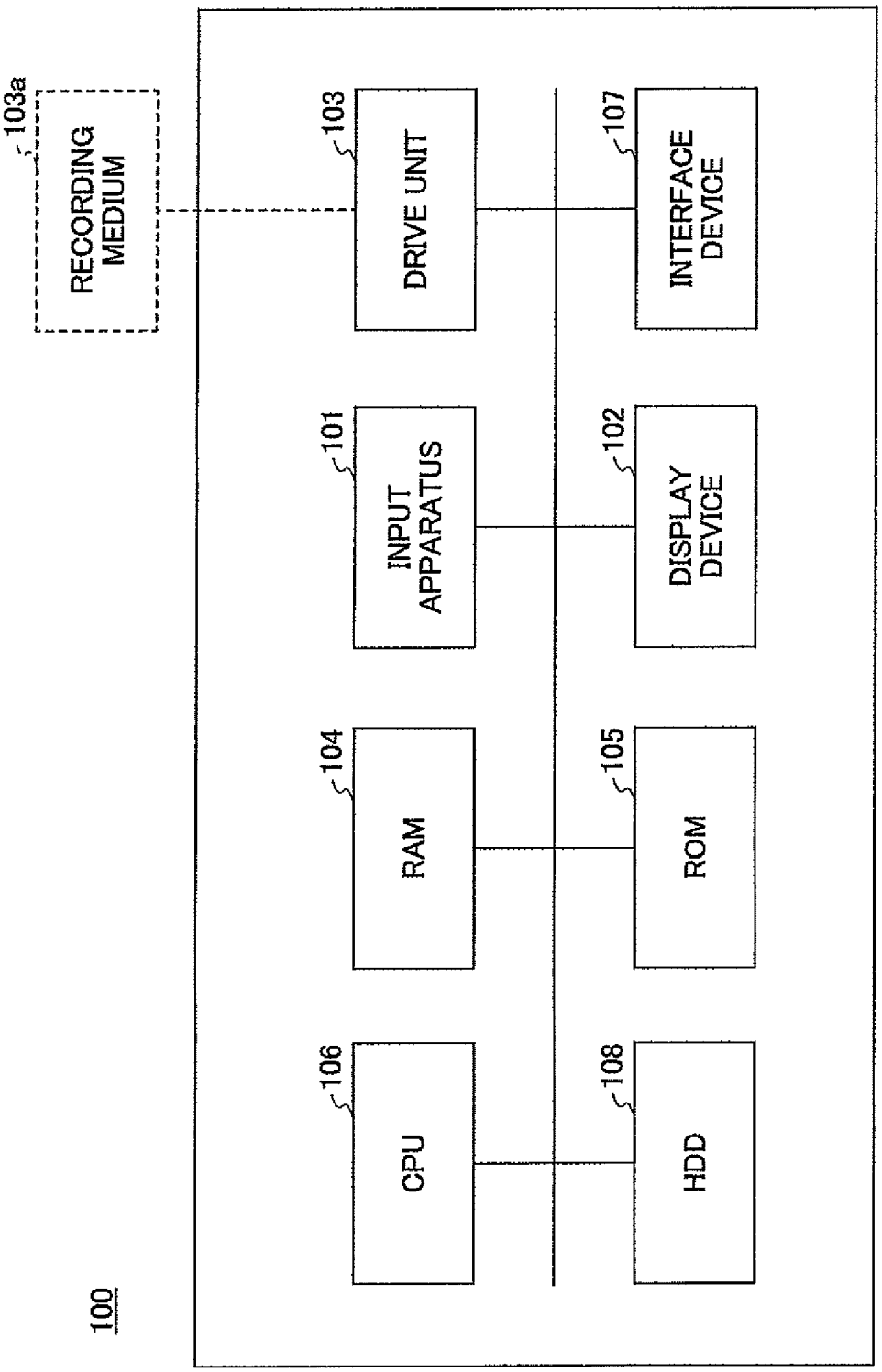
FIG. 2 is a drawing showing an example of a hardware configuration of a device control apparatus according to the first embodiment of the present invention.

Next, with respect to the device control system 1 described above, a description will given for a hardware configuration of the device control apparatus 100 for controlling the apparatuses. FIG. 2 is a drawing showing an example of the hardware configuration of the device control apparatus 100 according to the first embodiment of the present invention.

As shown in FIG. 2, the device control apparatus 100 includes an input device 101, a display device 102, a drive unit 103, a random access memory (RAM) 104, a read only memory (ROM) 105, a central processing unit (CPU) 106, an interface device 107 (or referred to as interface), and a hard disk drive (HDD) 100, in which each of the devices is connected to one another via a bus.

The input device 101 is provided with a keyboard and a mouse and is used to input operation signals. The display device 102 includes a display or the like and displays a process result or the like (for example, "device information acquired from the control target apparatus") of the device control apparatus 100.

The interface device 107 is an interface which connects the device control apparatus 100 to a data transmission line such as the network 90. As described for the system configuration above, the device control apparatus 100 performs data communication with the network apparatus 200, the PC 300 or the like via the interface device 107.

The HDD 108 is a nonvolatile storage device which stores programs and data for controlling the entire device control apparatus 100 and providing an information processing system (e.g. operating system (OS), basic software such as "Windows" (registered trademark) or "UNIX" (registered trademark)). The HDD 108 stores programs and data (e.g. "application program" and "application data") which provide plural functions (e.g. a "device control function" and a "data communication function") in an information processing system. Also, the HDD 108 controls the above stored programs and data by a predetermined file system and a database (DB).

The programs and data described above are provided on a recording medium 103*a* such as a compact disk (CD) for the device control apparatus 100, or provided from the network 90 by downloading via the interface device 107. For example, when the programs and data are provided by the recording medium 103*a*, the installation of the programs and data is achieved in the HDD 108 via the drive unit 103 which can read the recording medium 103*a*.

The ROM 105 is a nonvolatile semiconductor memory (storage device) which can hold internal data even when the power is off. The ROM 105 stores a basic input/output system (BIOS) which is executed when the device control apparatus 100 is booted, system settings, and each type of data including network related settings.

The RAM 104 is a nonvolatile semiconductor memory (storage device) which temporarily holds programs and data read from each of the storage devices described above. The CPU 106 performs the entire control of the device control apparatus 100 and operates each function included in the device control apparatus 100 by executing the programs read onto the RAM 104.

Based on the hardware configuration as described above, for example, the device control apparatus 100 executes the programs for achieving the device control function read into the RAM 104 from the HDD 108 by use of the CPU 106, so that state monitoring of the network apparatus 200 and information service can be performed.

<Device Information Acquiring Function>

With respect to the system configuration described above, a detailed description will be given below for a function which enables the device control apparatus 100 to control the local apparatus 400 connected to the PC 300 as a control target apparatus.

Figure 3:
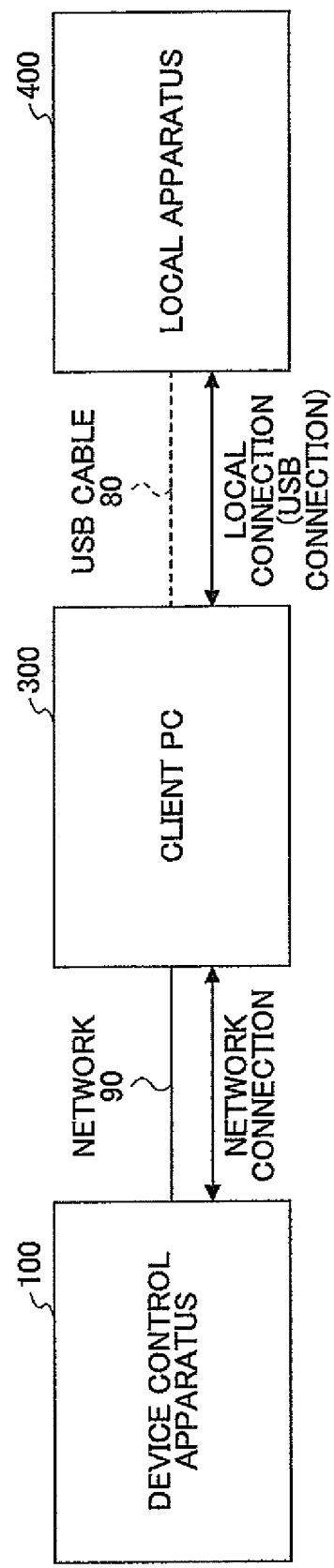
FIG. 3 is a drawing showing a connection example (case 1) of the device control apparatus, information processing apparatus, and a local apparatus of the first embodiment of the present invention.
Figure 4:
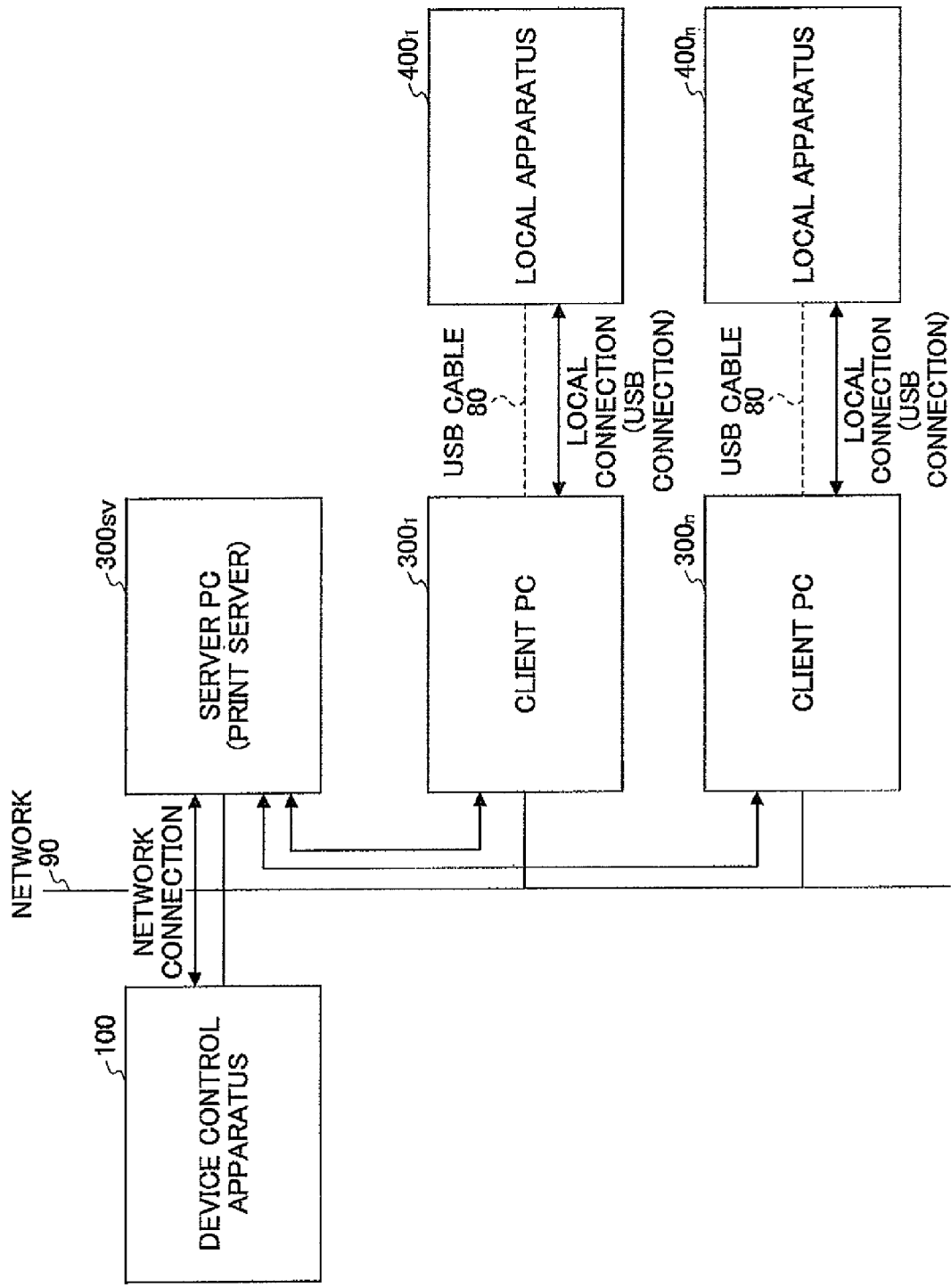
FIG. 4 a drawing showing another connection example (case 2) of the device control apparatus, information processing apparatuses, and local apparatuses of the first embodiment of the present invention.

FIGS. 3 and 4 are drawings showing examples (case 1 and case 2) of connections between the device control apparatus 1001 the PC 300 and the local apparatus 400 according to the first embodiment of the present invention.

In the case of FIG. 3, by use of a related art, the device control apparatus 100 cannot acquire the device information of the local apparatus 400 when the PC 300 does not perform a print server function, even if the PC 300 connected to the local apparatus 400 is connected to the device control apparatus 100 via the network 90. As a result, there is a case where the local apparatus 400 cannot be used as a control target apparatus.

When there are numerous local apparatuses 400 for control target apparatuses, print server software needs to be installed in each of PCs 300 which is connected to each of the local apparatuses 400. The procedure of installing the printer server software can be time consuming work.

Further, as shown in FIG. 4, as an example of a method reducing the problem described above, plural local apparatuses $400_{1-n}$ may be controlled by a PC $300_{SV}$ (server PC or print server) performing the print server function for plural PCs $300_{1-n}$ (client PCs) which are, respectively, connected to the plural local apparatuses $400_{1-n}$. In this way, the device control apparatus 100 can acquire the list and device information of each of the local apparatuses $400_{1-n}$ via the PC $300_{SV}$ performing the print server function.

However, in a case of the configuration described above, when the PC $300_{SV}$ has a problem for any reason, the device control apparatus 100 cannot acquire the list and device information of each of the local apparatuses $400_{1-n}$.

Further, more detailed information of the local apparatuses $400_{1-n}$ can be acquired via the PCs $300_{1-n}$ connected to the local apparatuses $400_{1-n}$ than via the PC $300_{SV}$ performing the print server function.

In this embodiment, it is noted that a remote control function of the OS, which is the basic software running in the PC 300, is utilized.

The remote control function operates remote control for the PC 300. The remote control function has been provided for recent OSs with the wide spread use of the internet and the advancement of information communication technology. This is a solution service included in recent OSs, which enables a user to identify and fix malfunctioning parts of the PC 300, and reboot the PC 300 without working at the physical location of the PC 300 when unexpected situations such as trouble happen to the PC 300. For example, this service solution corresponds to "remote assistance" or "remote desktop" of Windows.

The device control apparatus 100 of the present embodiment includes a device information acquiring function which acquires the device information of the local apparatus 400 connected to the PC 300 by using a remote control function provided by the OS running in the PC 300 (referred to as the OS of the PC 300).

A kernel including the basic function of an OS, a core part of the OS, provides basic functions of the OS such as monitoring application software and peripherals, managing resources such as a disk and memories, interrupt process and communication processing between processes.

Thus, the device control apparatus 100 of the present embodiment performs remote control for the PC 300 and acquires the device information of the local apparatus 400 via the kernel described above.

In this way, the device control apparatus 100 of the present embodiment can acquire the device information of the local apparatus 400 without installing specific software such as a print server software into the PC 300 connected to the local apparatus 400. As a result, it is possible to perform device control for devices which are not directly connected to the network 90.

In the following, a description will be given for the function configuration of the device information acquiring function 30.

<Function Configuration>

Figure 5:
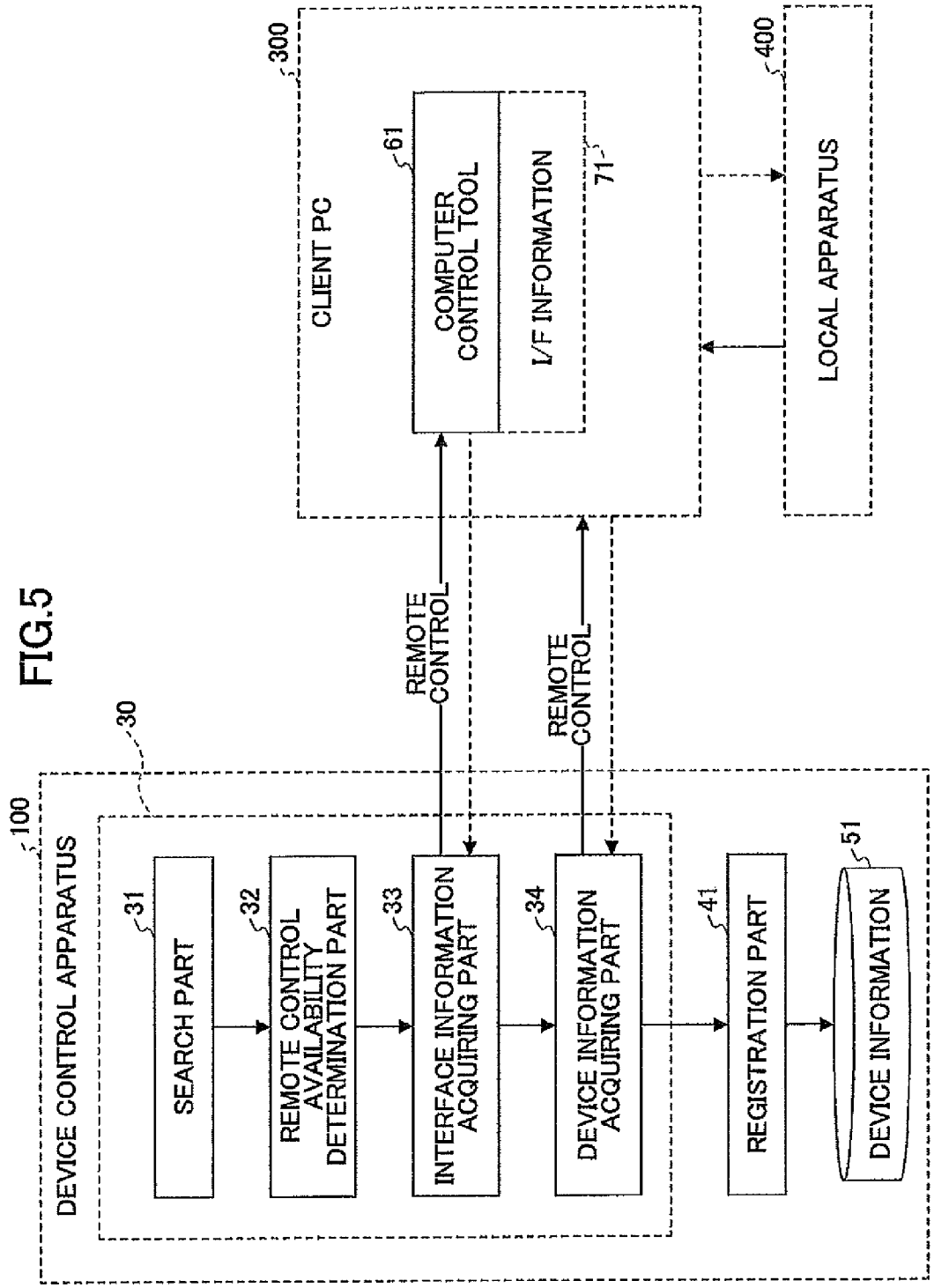
FIG. 5 is a drawing showing a structural example of functions of a device information acquiring function according to the first embodiment of the present invention.

FIG. 5 is a drawing showing a structural example of functions of a device information acquiring function 30 according to the first embodiment of the present invention.

The device information acquiring function 30 is mainly a function which is achieved by a software part of a device control component (application software) installed into the device control apparatus 100.

As shown in FIG. 5, the device information acquiring function 30 of the present embodiment includes plural function parts.

(Device Information Acquiring Function)

The device information acquiring function 30 mainly includes a search part 31, a remote control availability determination part 32, an interface information acquiring part 33 (I/F information acquiring part 33), and a device information acquiring part 34.

The search part 31 is connected to the network 90 and is a function which searches for a PC 300 that can communicate with the device control apparatus 100. For example, the search part 31 assumes the address range of a predetermined IP address as a searching range, and detects a response from the PC 300 designated by each IP address using a "ping" command. Based on the detection result, the search part 31 identifies the PC 300 which can communicate with the device control apparatus 100.

The "ping" command is a program for diagnosis of the Transmission Control Protocol/Internet Protocol (TCP/IP) network such as the internet and an intranet. When the "ping" command designates an IP address of a computer as a target to diagnose whether the target computer is connected, the "ping" command transmits data having a length of about 32 bytes using the Internet Control Message Protocol (ICMP), so that it is possible to diagnose the network based on the data about whether there is a response from the target computer, how long it takes to receive the response from the target computer if there is a response or the like.

Although a method is described in the above for the case where the "ping" command is used to confirm the availability of communication with the PC 300, the confirmation method is not limited to the method described above. Any network diagnosing program may be used as long as the method of network diagnosing can be used to confirm the availability of communication with the PC 300 from the device control apparatus 100.

The remote control availability determination part 32 is a function which determines whether remote control can be applied to the PC 300 (the PC 300 identified by the search part 31 as being available for communication) which has responded to the search part 31. In this case, the remote control availability determination part 32 examines the port number assigned based on the protocol used for providing the remote control function of the PC 300, and verifies whether the PC 300 can be connected so that the availability of the remote control is determined.

As an example of a method for examining the port number described above, the remote control availability determination part 32 performs a port scan for the PC 300.

The port scan accesses in turn each of plural ports provided as connection windows of the PC 300 so that application software running in the PC 300 and the type of the OS of the PC 300 can be examined.

With this, the remote control availability determination part 32 can examine the port number assigned for the remote control function.

As examples of protocols for providing the remote control function, there are "remote desktop protocol" (RDP), "remote procedure call" (RPC), 'secure shell (SSH), and "TELNET."

The remote control availability determination part 32 verifies the availability of connection with the PC 300 through the port number assigned based on the protocols described above by performing the port scan.

Based on the examination result, the remote control availability determination part 32 determines that the remote control is available when the connection is available, or the remote control availability determination part 32 determines that the remote control is not available when the connection is not available.

The I/F information acquiring part 33 accesses the PC 300 by the protocol available for the remote control when the determination result determined by the remote control availability determination part 32 is that the remote control is available, and the I/F information acquiring part 33 acquires information with respect to the interface (referred to as "I/F information" in the following) provided by the PC 300 by the remote control.

An I/F information 71 is information controlled by a computer control tool 61 (boot path "% SystemRoot %\system32\compmgmt.msc/s") of Windows OS.

The I/F information 71 includes information for supporting each of devices to be externally connected to the PC 300, such as adapters of a display unit and a network, and each type of serial port such as Universal Serial Bus(USB), Institute of Electrical and Electronics Engineers 1394 (IEEE 1394) and a Recommended Standard 232 version C (RS232C).

Also, Windows OS provides some Software Development Kits (SDKs) which are tool kits (module group) for acquiring the information described above by the remote control. As an example of a specific SDK, there is Windows Management Instrumentation SDK "WMT SDK."

The I/F information acquiring part 33 acquires the I/F information 71 by use of the SDK module described above. Specifically, the I/F information 71 is acquired by running the SDK module in the PC 300 by the remote control.

In the above description, a method for acquiring the I/F information 71 by using "WMI SDK" is described. However, the present invention is not limited by this method. For example, it is possible that the device control apparatus 100 transmits an I/F information acquiring program developed preliminary for being compatible with the platform of the PC 300, and causes the I/F information acquiring program to run in the PC 300 for acquiring each piece of information. This method is useful when the SDK described above cannot be used.

The device information acquiring part 34 accesses the PC 300 by the protocol available for the remote control, and acquires device information 51 of a local apparatus 400 via the PC 300 based on the I/F information 71 acquired by the I/F information acquiring part 33 by the remote control.

For example, the I/F information 71 acquired by the I/F information acquiring part 33 may include the information of each type of serial port such as USB, IEEE 1394, and RS232C when the PC 300 supports these types of serial communication ports. Further, this information may include information with respect to a connection destination (referred to as "connection destination information" in the following) such as "model name", "vender name" and "device driver."

The device information acquiring part 34 identifies that the local apparatus 400 is connected to "the PC 300 with which I/f" based on the connection destination information included in the I/F information 71, and accesses the local apparatus 400 via the identified I/F from the PC 300 by the remote control, so that the device information acquiring part 34 acquires the device information 51.

For example, when the local apparatus 400 is connected to the PC 300 via a USB cable 80 (indicated in FIG. 4), the device information acquiring part 34 identifies "USB" as the I/F connecting between the PC 300 and the local apparatus 400 based on the connection destination information indicating "the local apparatus 400 connected via the USB cable 80" included in the I/F information 71. Next, the device information 51 is acquired by accessing the local apparatus 400 via USB from the PC 300.

In this case, data communication and information acquisition between the PC 300 and the local apparatus 400 performed by the remote control is performed by communication modules and information acquisition modules included in the basic software such as the kernel.

As a result, the PC 300 acquires the device information 51 from the local apparatus 400 in response to an operation request of the device control apparatus 100 by the remote operation.

The device information acquiring part 34 transmits the device information 51 acquired via the PC 300 to the device control apparatus 100, so that the device information 51 of the local apparatus 400 can be acquired.

Although the description above is given for the method for acquiring the device information 51 of the local apparatus 400 via the PC 300 by the remote control, the present invention is not limited to this method. For example, it is possible that the device control apparatus 100 transmits a device information acquiring program developed in advance for being compatible with the PC 300, and causes the device information acquiring program to run in the PC 300 for acquiring each piece of information. This method is useful when the device information 51 cannot be sent and received between the PC 300 and the local apparatus 400 by the remote control from the device control apparatus 100.

As described above, the device control apparatus 100 searches for the PC 300 which is connected to the network 90 identical to which the device control apparatus 100 connects to, and determines whether the target PC 300 can be controlled by the remote control. As a result, when the PC 300 is available for the remote control, the device control apparatus 100 performs the remote control for the PC 300 and acquires the device information 51 of the local apparatus 400 via the PC 300.

(Device Control Function)

The device control apparatus 100 performs device control based on the device information 51 collected from the control target apparatus such as a network apparatus 200 or the local apparatus 400 by use of the device information acquiring function 30.

The device control apparatus 100 includes a registration part 41 which stores the collected device information 51 to a predetermined storage area of a storage device (e.g. "HDD 108" or the like), so that the device control apparatus 100 performs the device control by monitoring the change of the state of the control target apparatus based on the collected device information 51.

<<Operation of Function>>

In the following, a description will be given for operations acquiring the device information 51 of the local apparatus 400 by each function part described above. The device information acquiring function 30 performs a function by the cooperation of each of the function parts described above. A software part for achieving the device information acquiring function 30 included in the device control apparatus 100 is read from a stored part (e.g. "ROM 105" or the like) of the software part and stored to the RAM 104 by a CPU 106, and the following process is executed so that the device information acquiring function 30 is achieved.

(Device Information Acquisition Process of Local Apparatus)

Figure 6:
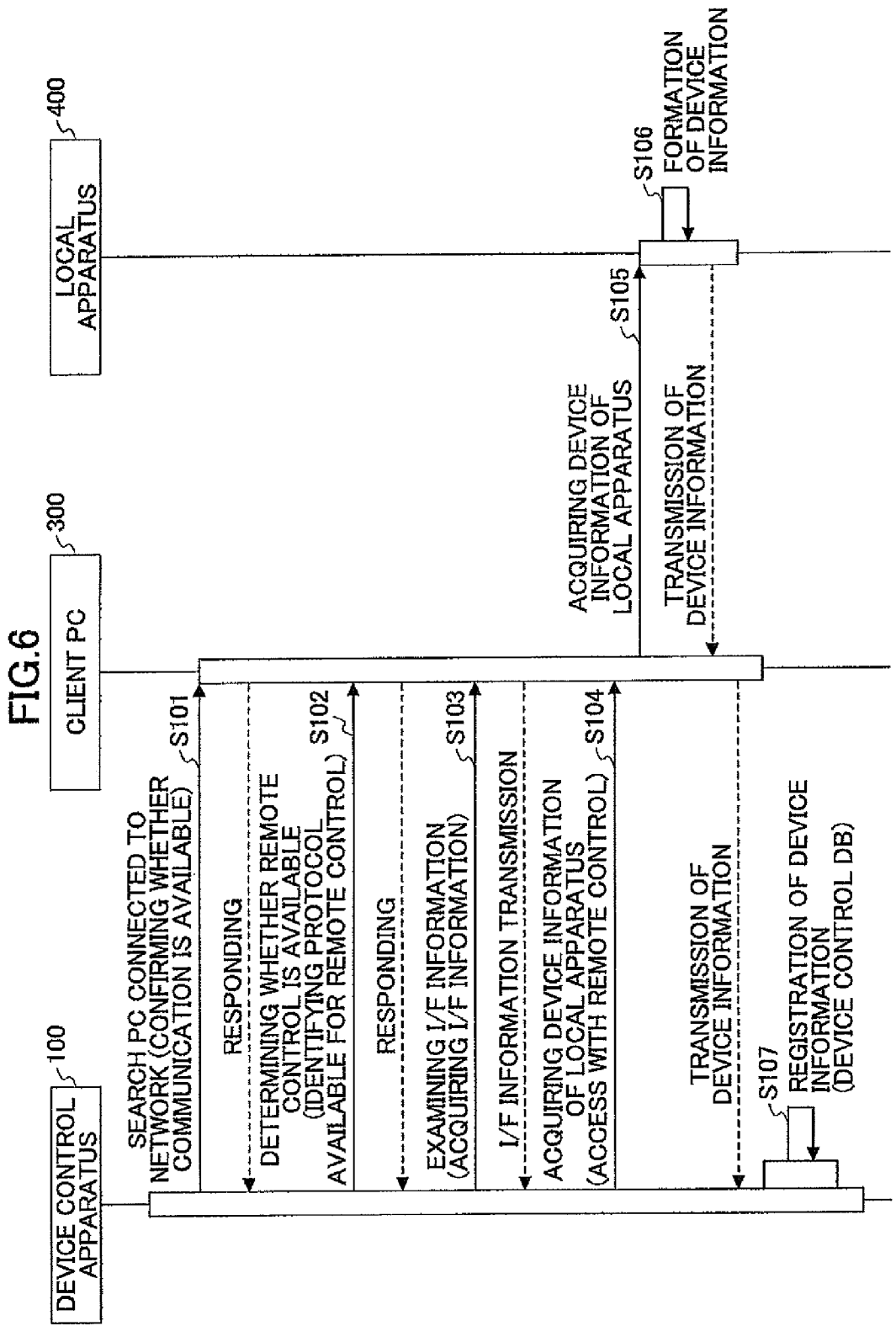
FIG. 6 is a sequence diagram indicating a process sequence for acquiring the device information of the local apparatus of the first embodiment according to the present invention.

FIG. 6 is a sequence diagram showing an example of the process for acquiring the device information 51 of the local apparatus 400 according to the first embodiment of the present invention. In the process below, a description will be given for an example case where the local apparatus 400 is connected to the PC 300 via the USB cable 80.

As shown in FIG. 6, firstly, the device control apparatus 100 searches for the PC 300 connected to the network 90 by the search part 31 in step S101. In this case, the search part 31 confirms whether the communication between the device control apparatus 100 and the PC 300 is available by a network diagnosis program such as a "ping" command based on the response from the PC 300.

The device control apparatus 100 determines whether the remote control is available to the PC 300 having responded to the search part 31 by the remote control availability determination part 32 in step S102. In this case, the remote control availability determination part 32 examines the port number of the PC 300 assigned for the protocol of the remote control function by using the port scan, and verifies whether the connection with the PC 300 is available with the port number based on the response from the PC 300.

The device control apparatus 100 accesses the PC 300 by use of the protocol available for the remote control from the I/F information acquiring part 33, and acquires the I/F information 71 provided by the PC 300 with the remote control in step S103, when it is determined that the remote control to the PC 300 is available.

The device control apparatus 100 accesses the PC 300 by the protocol available for the remote control, and acquires the device information 51 of the local apparatus 400 via the PC 300 with the remote control in step S104 based on the connection destination information included in the I/F information 71 acquired by the I/F information acquiring part 33.

The PC 300 acquires the device information 51 from the local apparatus 400 via USB of the I/F designated from the connection destination information by the remote control from the device control apparatus 100 in step S105. In this case, the local apparatus 400 generates the device information 51 requested by the PC 300 and transmits the device information 51 to the PC 300 in step S106.

The device control apparatus 100 causes the device information acquiring part 34 to transmit the device information 51 acquired by the PC 300 to the device control apparatus 100 with the remote control, so that the device control apparatus 100 acquires the device information 51 of the local apparatus 400.

The device control apparatus 100 stores the acquired device information 51 of the local apparatus 400 into a predetermined area of the storage device by the registration part 41, so that the device control apparatus 100 registers the acquired device information 51 of the local apparatus 400 to the device control database DB or the like in step S107.

<Recap>

As described above, according to the first embodiment of the present invention, the device control apparatus 100 of this embodiment searches for the PC 300 connected to the identical network 90 to which the device control apparatus 100 is connected, and determines whether the target PC 300 is available for the remote control.

Accordingly, when the target PC 300 is available for the remote control, the device control apparatus 100 acquires the device information 51 of the local apparatus 400 via the PC 300 with the remote control.

In this way, the device control apparatus 100 can acquire the device information 51 of the local apparatus 400 without installing specific software such as print server software into the PC 300 connected to the local apparatus 400. Thus, the device control apparatus 100 can perform device control for apparatuses which are not directly connected to the identical network 90.

With this, in the device control system 1 according to this embodiment, an apparatus (local apparatus) such as a printer and a scanner connected to the user terminal (PC 300) via a USB cable 80 or the like and used by each user (privately used) can be controlled as a control target apparatus as well as an apparatus such as MFP (network apparatus 200) connected to the network 90 and commonly used by users.

[Second Embodiment]

In the first embodiment, the description has been given for the case where the device control apparatus accesses to the local apparatus via the PC and acquires the device information of the local apparatus.

On the other hand, there is a case such as "access denied" based on the security protection of data processed in the local apparatus or "unavailability of the I/F" that is used when the device control apparatus accesses the local apparatus. Therefore, there is a case where it is not easy for the device control apparatus to acquire the device information from the local apparatus.

In the present embodiment, it is observed that I/F information managed by the computer management tool is dynamically renewed when a local apparatus is connected to a PC, and thus the device information of the local apparatus is acquired from the renewed I/F information.

A PC includes a function called "Plug and Play" or "PnP" (referred to as plug-and-play) which automatically performs the installation and the setting operations of an apparatus by which hardware and firmware, a driver, the OS and application are automatically coordinated when the apparatus, an expansion card or the like is connected to the PC. In this case, when the plug-and-play operates, device information of the connected apparatus is acquired as the device information, and the I/F information is renewed.

Thus, in the present embodiment, the device control apparatus accesses the PC by the protocol available for the remote control and acquires the device information of the local apparatus from the renewed I/F information renewed by the plug-and-play.

In the following, a description will be given for the device information acquiring function included in the device control apparatus according to the present embodiment. In this case, as for the parts similar to the case of the first embodiment, identical reference symbols are used and the explanation will be omitted for convenience.

<Device Information Acquiring Function>
<<Configuration of Function>>

A device information acquiring function 30 of the present embodiment includes mainly a search part 31, a remote control availability determination part 32, an I/F information acquiring part 33, and a device information acquiring part 34, which are of a similar configuration to that of the first embodiment.

The different part from the first embodiment is a function included in the device information acquiring part 34.

In the device information acquiring part 34 of the first embodiment, the I/F which connects between the PC 300 and the local apparatus 400 is identified from the I/F information 71 acquired by the I/F information acquiring part 33, and then the device information 51 of the local apparatus 400 is acquired via the PC 300 by use of the identified I/F.

On the other hand, the device information acquiring part 34 according to the present embodiment determines whether the device information 51 of the local apparatus 400 can be acquired via the PC 300 by the remote control, and when determined that the device information 51 cannot be acquired, the device information 51 of the local apparatus 400 is acquired from the renewed I/F information 71 renewed by plug-and-play.

The device information acquiring part 34 extracts connection destination information from the renewed I/F information 71 renewed by plug-and-play, namely, from the I/F information 71 acquired by the I/F information acquiring part 33, so that the device information 51 of the local apparatus 400 is acquired.

Figure 7:
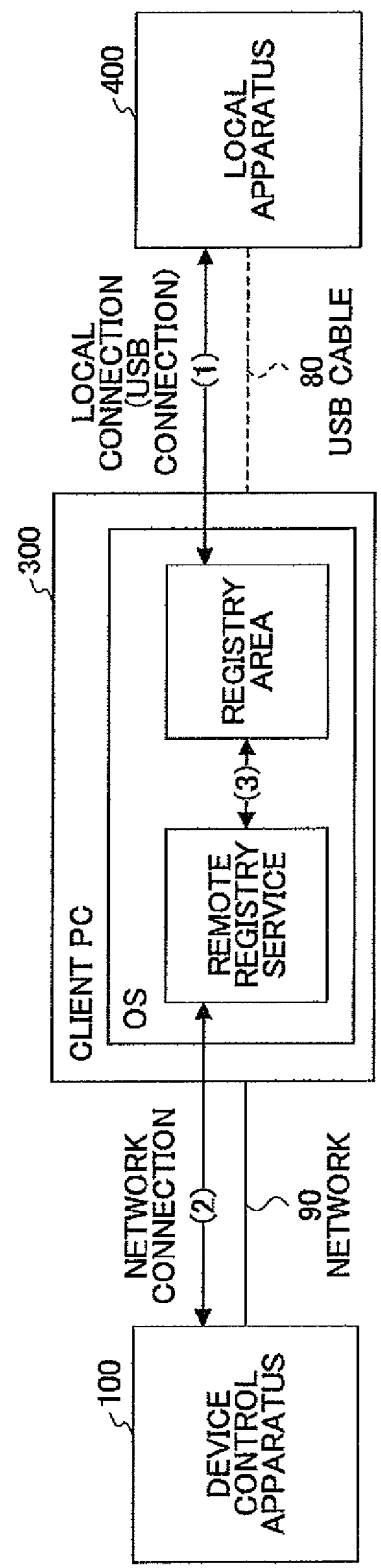
FIG. 7 is a drawing showing an operation example of the device information acquiring function according to the second embodiment of the present invention.

Specifically, the device information is acquired from the local apparatus 400 by the operation as shown in FIG. 7 below.

FIG. 7 is a drawing showing an operation example of the device information acquiring function 30 according to the second embodiment of the present invention. As is seen in FIG. 7, firstly, (1) when the local apparatus 400 is connected to the PC 300 via the USB cable 8O, the plug-and-play information is acquired from the local apparatus 400 automatically, and each type of the acquired information is written into the registry area of the PC 300 as the I/F information 71. Further, the device control apparatus 100 reads, (2) by "Remote Registry Service" (referred to as remote-registry-service) included in the OS of the PC 300 with the remote control of the device information acquiring part 34, (3) the I/F information 71 written while plug-and-play is performed by accessing the registry area of the PC 300.

In operation of (2), data transmit/receive is performed between the device information acquiring part 34 included in the device control apparatus 100 and the remote-registry-service of the PC 300 by use of "Server Message Block Pipe Protocol" (SMB pipe-protocol). Further, in operation (3), the access to the registry area is performed by accessing a named pipe "¥¥pipe¥winreg," of the remote-registry-service. In this case, the "named pipe" is a method of Windows OS for performing communication between processes, which shares a predetermined stream between the processes and performs cooperative operation by performing write/read with each other.

<<Operation of Function>>

In the following, a description will be given for operations for acquiring the device information 51 of the local apparatus 400 by the device information acquiring function 30 including the device information acquiring part 34 described above. The device information acquiring function 30 functions by the cooperation of function described above, and is achieved via a software part providing the device information acquiring function 30 which is installed in the device control apparatus 100 by reading from the stored part such as "ROM 105" and storing into the RAM 104 by the CPU 106, and then the device information acquiring function 30 is achieved by performing the following process.

(Device Information Acquisition Process of Local Apparatus)

Figure 8:
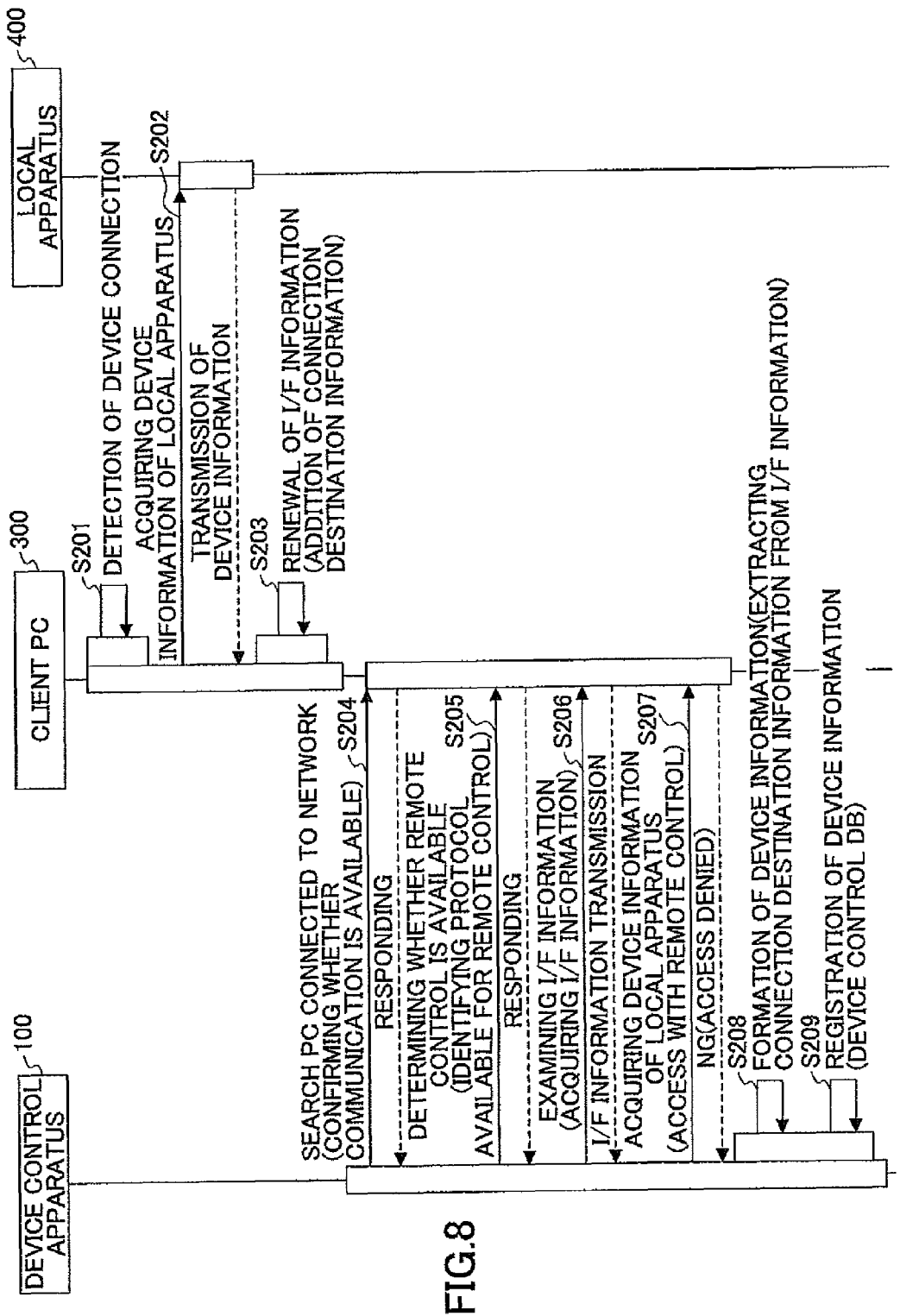
FIG. 8 is a sequence diagram indicating a process sequence for acquiring the device information of the local apparatus according to the second embodiment of the present invention.

FIG. 8 is a sequence diagram indicating a process sequence for acquiring the device information 51 of the local apparatus 400 according to the second embodiment of the present invention. In the following process, a description will be given for a case where the local apparatus 400 is connected to the PC 300 via the USB cable 80.

As shown in FIG. 8, firstly, when the PC 300 detects that the local apparatus 400 is connected to the PC 300 in step S201, the device information 51 is acquired from the local apparatus 400 via the USB cable 80 by the plug-and-play function.

As a result, the PC 300 adds the device information 51 acquired from the local apparatus 400 to the I/F information 71 controlled by the computer control tool 61 as the connection destination information, and renews the I/F information 71 in step S203. In this case, each of the acquired types of information is written and held into the registry area.

In this state, the device control apparatus 100 searches for the PC 300 connected to the network 90 by the search part 31 in step S204, and determines whether the remote control is available for the PC 300 having responded to the search part 31 by the remote control availability determination part 32 in step S205.

The device control apparatus 100 accesses the PC 300 from the I/F information acquiring part 33 with the protocol available for the remote control, and acquires the I/F information 71 provided with the PC 300 by the remote control in step S206.

The device control apparatus 100 accesses the PC 300 with the protocol available for the remote control by the device information acquiring part 34, and determines whether the device information 51 of the local apparatus 400 can be acquired via the PC 300 with the remote control based on an error that occurs while the PC 300 is accessed. When the result of the determination indicates that the acquisition is unavailable by the remote control ("an error caused by access refused" occurs), the device control apparatus 100 acquires the device information 51 of the local apparatus 400 from the renewed I/F information 71 renewed by the plug-and-play in step S207. In this case, the device information acquiring part 34 extracts the connection destination information from the I/F information 71 acquired from the I/F information acquiring part 33 described above, and then the device information 51 of the local apparatus 400 is acquired in step S208. Also, the device information acquiring part 34 accesses the remote-registry-service included in the PC 300 by use of the SMB pipe-protocol, and acquires the device information 51 of the local apparatus 400 from the I/F information 71 held in the registry area in step S203.

As a result, the device control apparatus 100 stores the acquired device information 51 of the local apparatus 400 in the predetermined storage area of the storage device by the registration part 41, and the acquired device information 51 is then registered into the device control DB or the like in step S209.

<Recap>

As described above, according to the second embodiment of the present invention, the device control apparatus 100 of the embodiment searches for the PC 300 connected to the identical network 90 to which the device control apparatus 100 is connected, and determines whether the target PC 300 is available for the remote control.

If the remote control is available, the device control apparatus 100 acquires the device information 51 of the local apparatus 400 via the PC 300.

If it is impossible to acquire the device information 51 of the local apparatus 400 via the PC 300 with the remote control because "access denied", "unavailability of the I/F" or the like occurs, then the device control apparatus 100 acquires the device information 51 of the local apparatus 400, acquired by the PC 300 with the plug-and-play function when the local apparatus 400 is connected, from the connection destination information included in the I/F information 71 controlled by the computer control tool 61.

In this manner, the device control system 1 and the device control apparatus 100 according to the present embodiment can obtain the same effect as the case of the first embodiment even for the local apparatus 400 with high security or the device control apparatus 100 supporting the I/F insufficiently.

[Third Embodiment]

The device information acquiring functions according to the first and second embodiments may have a situation where the device information of the local apparatus cannot be acquired or the acquired device information is deficient.

In the present embodiment, a device information acquiring function is included, in which the device information acquiring function acquires the device information (including the device information for compensating the deficiency) of the local apparatus from the device driver (except for the I/F information) of the local apparatus installed the PC to which the local apparatus is connected.

In the following, a description will be given for the device information acquiring function included in the device control apparatus according to the present embodiment. Further, as for parts similar to those used in the case of each embodiment described above, identical symbols are used and the explanation is omitted for convenience.

<Device Information Acquiring Function>
<<Configuration of Function>>

A device information acquiring function 30 according to the present embodiment includes mainly a search part 31, a remote control availability determination part 32, an I/F information acquiring part 33, and a device information acquiring part 34, which is similar in configuration to that of the first embodiment.

In this case, a different part in the present embodiment from the each embodiment described above is the function included in the device information acquiring part 34.

In each of the embodiments described above, the device information acquiring part 34 acquires the device information 51 of the local apparatus 400 based on the I/F information 71 acquired by the I/F information acquiring part 33.

On the other hand, the device information acquiring part 34 of the present embodiment acquires the device information 51 of the local apparatus 400 with the remote control from information included in a device driver which is compatible to the local apparatus 400 installed to the PC 300.

The device driver is dynamically installed to the PC 300 by the plug-and-play function included in the PC 300 while the local apparatus 400 is connected to the PC 300.

The device information acquiring part 34 accesses the PC 300 with the protocol available for the remote control, extracts each type of information with respect to devices (device information) such as provided function information (e.g. "printer") of devices included in the device driver compatible with the local apparatus 400, optional configuration information (e.g. double-side unit installation), and operation setting information (e.g. "default paper/type of paper settings") by the remote control, and then acquires the device information 51 of the local apparatus 400.

Also, the device information acquiring part 34 determines whether the device information 51 of the local apparatus 400 is acquired, and whether there is insufficient information in the acquired device information 51. When the device information 51 is not acquired or the acquired information is insufficient, the device information acquiring part 34 acquires the device information 51 of the local apparatus 400 from the information included in the device driver compatible with the local apparatus 400.

<<Operation of Function>>

In the following, a description will be given for the operation to acquire the device information 51 of the local apparatus 400 by the device information acquiring function 30 including the device information acquiring part 34 described above.

The device information acquiring function 30 functions with cooperation of each of the function parts described above. The device information acquiring function 30 is achieved by which a software part, configured to achieve the device information acquiring function 30, installed into the device control apparatus 100, is read from a storage destination (e.g. "ROM 105" or the like) by the CPU 106, and is executed by the following process.

(Device Information Acquiring Process of Local Apparatus)

Figure 9:
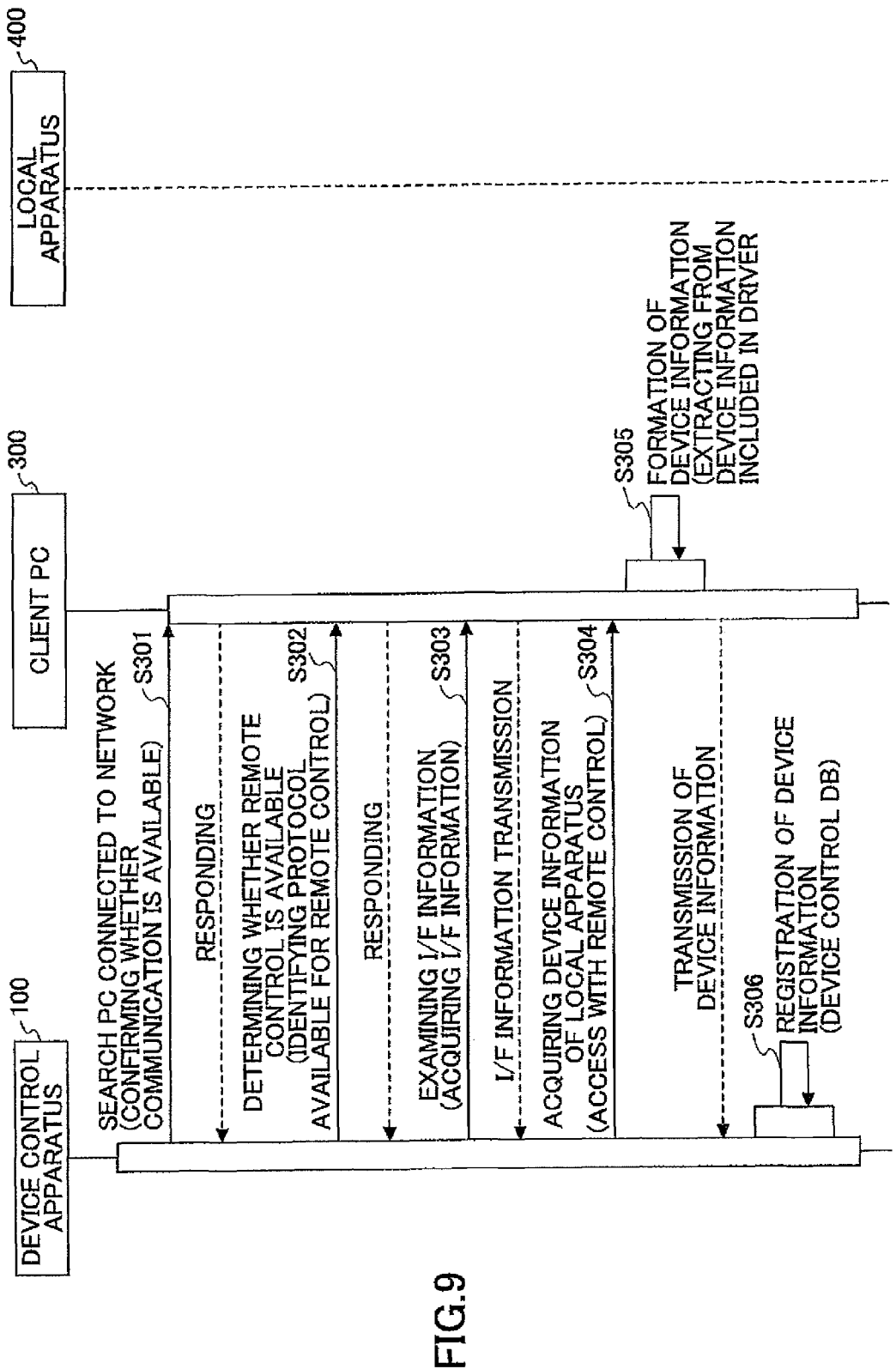
FIG. 9 is a sequence diagram indicating a process sequence for acquiring the device information of the local apparatus according to the third embodiment of the present invention.

FIG. 9 is a sequence diagram indicating a process sequence for acquiring the device information 51 of the local apparatus 400 according to the third embodiment of the present invention.

As shown in FIG. 9, the device control apparatus 100 searches for the PC 300 connected to the network 90 by the search part 31 in step S301, and determines whether the target PC 300 responding while searching is available for the remote control in step S302.

When the device control apparatus 100 determines that the remote control for the PC 300 is available, the device control apparatus 100 accesses the PC 300 with the protocol available for the remote control by use of the I/F information acquiring part 33, and acquires the I/F information 71 provided by the PC 300 in step S303.

The device control apparatus 100 determines whether the device information acquiring part 34 acquires the device information 51 of the local apparatus 400, and determines whether the acquired device information 51 of the local apparatus 400 is insufficient or not. When the determination of the device control apparatus 100 indicates that the device information 51 is not acquired or the acquired device information 51 is insufficient, the device information acquiring part 34 acquires the device information 51 of the local apparatus 400 in step S304 from the information included in the device driver compatible with the local apparatus 400 with the remote control. In this case, the device information acquiring part 34 extracts each type of device information from the information included in the device driver described above, thereby acquiring the device information 51 of the local apparatus 400 in step S305.

The device control apparatus 100 stores the device information 51 of the local apparatus 400 into a predetermined storage area of the storage device by the registration part 41, so that the device control apparatus 100 registers the device information 51 of the local apparatus 400 into the device control DB or the like in step S306.

<Recap>

As described above, according to the third embodiment of the present invention, the device control apparatus 100 searches for the PC 300 connected to the identical network 90 to which the device control apparatus 100 is connected, and determines whether the target PC is available for the remote control.

When the determination indicates that the remote control is available, the device control apparatus 100 acquires the device information 51 of the local apparatus 400 via the PC 300 with the remote control.

In this case, when "unavailability of the device information 51" or "lack of information of the acquired device information 51" occurs for some reason, the device control apparatus 100 acquires the device information 51 of the local apparatus 400 from the information included in the device driver compatible with the local apparatus 400 installed to the PC 300 with the remote control.

In this manner, the device control system 1 and the device control apparatus 100 according to the present embodiment can perform an effect similar to each of the embodiments described above, even if there is a case where the device information 51 cannot be acquired from the local apparatus 400 or a case where the acquired device information 51 does not include sufficient information for performing the device control for some reason.

Further, in the present embodiment, the description is given for a configuration in which the device information 51 is acquired from the device driver compatible with the local apparatus 400 installed to the PC 300 by the plug-and-play. However, the present invention is not limited to this configuration. For example, with respect to the registry area described in the second embodiment, when the device driver described above is installed into the PC 300 by the plug-and-play, there is a case where information included in the device driver is written in the registry area. Thus, as described in the second embodiment, the device information acquiring part 34 included in the device control apparatus 100 may access "remote registry service" included in the PC 300 by use of "SMB pipe-protocol" so that the device control apparatus 100 acquires the device information 51 of the local apparatus 400 from the information held in the registry area.

[Fourth Embodiment]

In the first and second embodiments, the descriptions are given for the configuration in which the device information of the local apparatus is acquired based on the I/F information included in the PC or via the PC. Also, in the third embodiment, the description is given for the configuration in which the device information of the local apparatus is acquired from the device driver installed in the PC.

In the present embodiment, a description will be given for a device information acquiring function which the device information of the local apparatus is acquired by operating a computer controlling tool of Windows OS from the device control apparatus with remote control. In this case, with respect to parts similar to those used in each case of the embodiments described above, identical symbols are used and the explanations are omitted for convenience.

<Device Information Acquiring Function>
<<Configuration of Function>>

FIG. 10 is a drawing showing a structural example of functions of device information acquisition according to the fourth embodiment of the present invention.

The device information acquiring function 30 according to the present embodiment includes, mainly, the search part 31, the remote control availability determination part 32, and the device information acquiring part 34.

In this case, the only part that is different from each of the embodiments described above is that the I/F information acquiring part 33 is not included.

The I/F information acquiring part 33 according to each of the embodiments described above performs the remote control from the device control apparatus 100 to the PC 300 at the device information acquiring part 34, and when accessing the local apparatus 400 via the PC 300, the I/F information acquiring part 33 acquires the information to identify the I/F to be connected to the local apparatus 400 and the PC 300.

However, in the present embodiment, the device information 51 is acquired from the local apparatus 400 by use of the computer control tool 61 (program achieving the device control function) of the OS operating in the PC 300, and thus there is no need to identify the I/F which connects between the PC 300 and the local apparatus 400 in the device control apparatus 100.

With this, the device information acquiring function 30 of the present embodiment does not include the I/F information acquiring part 33.

Further, as another different part without the above difference, the function of the device information acquiring part 34 is different from that of each case of the above embodiments.

The device information acquiring part 34 accesses the PC 300 with the protocol available for the remote control, operates the computer control tool 61 (program achieving the device control function) with the remote control, and then acquires the device information 51 of the local apparatus 400 via the PC 300. For example, the device information acquiring part 34 operates the computer control tool 61, and acquires the device information 51 from the local apparatus 400 by use of "WMI SDK."

<<Operation of Function>>

FIG. 11 a sequence diagram indicating a process sequence for acquiring the device information 51 of the local apparatus 400 according to the fourth embodiment of the present invention.

As shown in FIG. 11, firstly, the device control apparatus 100 searches for the PC 300 connected to the network 90 by the search part 31 in step S401, and determines whether the target PC 300 responding during the search is available for the remote control by the remote control availability determination part 32 in step S402.

When the determination indicates that the remote control to the PC 300 is available, the device control apparatus 100 accesses the PC 300 with the protocol available for the remote control from the device information acquiring part 34, and operates the computer control tool 61 with the remote control, so that the device control apparatus 100 acquires the device information 51 from the local apparatus 400 via the PC 300 in step S403.

In the PC 300, the computer control tool 61 is operated by the remote control from the device control apparatus 100, and the PC 300 acquires the device information 51 from the local apparatus 400 via a USB which is the I/F connecting between the PC 300 and the local apparatus 400 in step S404. In this case, the local apparatus 400 generates the device information 51 requested from the local apparatus 400 and transmits the generated device information 51 to the PC 300 in step S405.

The device control apparatus 100 transmits the device information 51 acquired via the PC 300 from the PC 300 to the device control apparatus 100 by the device information acquiring part 34 with the remote control, so that the device control apparatus 100 acquires the device information 51 of the local apparatus 400.

The device control apparatus 100 stores the acquired device information 51 of the local apparatus 400 into the predetermined storage area of the storage device by the registration part 41, and then the acquired device information 51 is registered into the device control DB or the like in step S406.

<Recap>

As described above, according to the fourth embodiment of the present invention, the device control apparatus 100 of this embodiment searches for the PC 300 connected to the identical the network 90 to which the device control apparatus 100 is connected, and determines whether the target PC 300 is available for the remote control.

When the determination indicates that the remote control is available, the device control apparatus 100 acquires the device information 51 of the local apparatus 400 via the PC 300 with the remote control.

In this case, the device control apparatus 100 operates the computer control tool 61 included in the OS running in the PC 300 with the remote control, so that the device control apparatus 100 acquires the device information 51 from the local apparatus 400.

In this manner, the device control system 1 and the device control apparatus 100 according to the present embodiment can perform an effect similar to that of each of the embodiments described above. Since there is no process needed to identify the I/F which connects between the local apparatus 400 and the PC 300, the processing time for acquiring the device information 51 from the local apparatus 400 can be reduced. Thus, the device information acquiring speed can be increased.

So far, the present invention has been described based on each of the embodiments above. The "device information acquiring function" included in the device control apparatus 100 according to each of the above embodiments can be achieved by causing the CPU 106 to execute a computer program coded from each of the process sequences described by the figures by a program language compatible with the corresponding operation environment (platform). Thus, the program described above can be stored on the computer-readable recording medium 103a.

Further, by storing the program described above into the recording medium 103 such as a floppy (registered trademark) disk, a compact disc (DC), and a digital versatile disk (DVD), the program described above can be installed into the device control apparatus 100 via the drive unit 103 which can read these recording media 103a. Also, since the device control apparatus 100 includes the interface device 107, the device control apparatus 100 can install the program described above by downloading via electrical communication lines such as the internet.

According to the embodiments of the present invention, it is possible to provides a device control apparatus which can acquire the device information of the device locally connected to the information processing apparatus by use of the remote control function of the basic program (OS) running in the information processing apparatus, so that, without installing specific software in the information processing apparatus connected to the local apparatus, the device control apparatus can acquire the device information of the local apparatus.

The present invention is not limited to the specifically disclosed embodiments, and variations and modifications may be made without departing from the scope of the present invention.

The present application is based on Japanese patent applications No. 2008-051725 filed on Mar. 3, 2008 and No. 2008-308957 filed on Dec. 3, 2008, the entire contents of which are hereby incorporated herein by reference.

What is claimed is:

1. A device control apparatus configured to control a device based on device information acquired from the device, the device control apparatus comprising:
a storage unit; and
a processing unit comprising:
a search part configured to search for an information processing apparatus that is coupled to a network to which the device control apparatus is coupled, the device being locally coupled to the information processing apparatus via a predetermined interface;
a remote control availability determining part configured to make a determination on whether the information processing apparatus searched by the search part is remotely controllable; and
a device information acquiring part configured to acquire device information of the device locally coupled to the information processing apparatus via the predetermined interface by remotely controlling the information processing apparatus based on the determination made by the remote control availability determining part,
wherein the device information acquiring part uses a remote control function provided by an operating system operated in the information processing apparatus in order to acquire, via a kernel of the operating system, the device information of the device locally coupled to the information processing apparatus;
wherein the search part, the remote control availability determining part, and the device information acquiring part are stored in the storage unit.

2. The device control apparatus as claimed in claim 1, wherein the processing unit further comprises:
an interface information acquiring part configured to remotely control the information processing apparatus based on the determination made by the remote control availability determining part, and to acquire interface information with respect to the predetermined interface to be used when the device is locally coupled to the information processing apparatus.

3. The device control apparatus as claimed in claim 2, wherein the device information acquiring part acquires the device information of the device from connection destination information included in the interface information with respect to the interface acquired by the interface information acquiring part if the device information cannot be acquired by remote control from the device locally coupled to the information processing apparatus via the interface.

4. The device control apparatus as claimed in claim 1, wherein the device information acquiring part acquires the device information of the device from another device information included in a device driver running in the information processing apparatus if the device information cannot be acquired by remote control from the device locally coupled to the information processing apparatus via the interface.

5. A device control method for controlling a device by a computer based on device information acquired from the device, the device control method comprising:
a searching procedure causing the computer to search for an information processing apparatus that is coupled to a network to which the computer is coupled, the device being locally coupled to the information processing apparatus via a predetermined interface;
a determining procedure causing the computer to make a determination on whether the information processing apparatus searched is remotely controllable;
a control procedure causing the computer to acquire device information of the device locally coupled to the information processing apparatus via the predetermined interface by remotely controlling the information processing apparatus based on the determination made by the determining procedure,
wherein the control procedure uses a remote control function provided by an operating system running in the information processing apparatus in order to acquire, via a kernel of the operating system, the device information of the device locally coupled to the information processing apparatus.

6. The device control method as claimed in claim 5, further comprising:
an acquiring procedure causing the computer to remotely control the information processing apparatus based cm the determination made by the determining procedure, and to acquire interface information with respect to the predetermined interface to be used when the device is locally coupled to the information processing apparatus.

7. The device control method as claimed in claim 6, wherein the control procedure acquires the device information of the device from connection destination information included in the interface information with respect to the predetermined interface if the device information cannot be acquired by remote control from the device locally coupled to the information processing apparatus via the interface.

8. The device control method as claimed in claim 5, wherein the control procedure acquires the device information of the device from another device information included in a device driver operating in the information processing apparatus if the device information cannot be acquired by remote control from the device locally coupled to the information processing apparatus via the interface.

9. A non-transitory computer-readable recording medium that stores a program which, when executed by a computer, causes the computer to perform a device control process, the device control process comprising:
a searching procedure causing the computer to search for an information processing apparatus that is coupled to a network to which the computer is coupled, and the device is locally coupled to the information processing apparatus via a predetermined interface;
a determining procedure causing the computer to make a determination on whether the information processing apparatus searched by the searching procedure is remotely controllable;
a control procedure causing the computer to acquire device information of the device locally coupled to the information processing apparatus via the predetermined interface by remotely controlling the information processing apparatus based on the determination made by the determining procedure,
wherein the control procedure uses a remote control function provided by an operating system running in the information processing apparatus in order to acquire, via a kernel of the operating system, the device information of the device locally coupled to the information processing apparatus.

10. The non-transitory computer-readable storage medium as claimed in claim 9, wherein the device control process further comprises:
an acquiring procedure causing the computer to remotely control the information processing apparatus based on the determination made by the determining procedure, and to acquire interface information with respect to the predetermined interface to be used when the device is locally coupled to the information processing apparatus.

11. The non-transitory computer-readable storage medium as claimed in claim 10, wherein the control procedure acquires the device information of the device from connection destination information included in the interface information with respect to the predetermined interface if the device information cannot be acquired by remote control from the device locally coupled to the information processing apparatus via the interface.

12. The non-transitory computer-readable storage medium as claimed in claim 9, wherein the control procedure acquires the device information of the device from another device information included in a device driver operating in the information processing apparatus if the device information cannot be acquired by remote control from the device locally coupled to the information processing apparatus via the interface.

* * * * *